(12) United States Patent
Sperrfechter et al.

(10) Patent No.: US 8,991,576 B2
(45) Date of Patent: Mar. 31, 2015

(54) TORQUE CONVERTER DEVICE FOR A MOTOR VEHICLE

(71) Applicant: Daimler AG, Stuttgart (DE)

(72) Inventors: Stefan Sperrfechter, Donzdorf (DE); Tobias Haerter, Stuttgart (DE); Heinrich Straub, Stuttgart (DE); Bernhard Ziegler, Rechberghausen (DE); Tobias Schuster, Esslingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/174,757

(22) Filed: Feb. 6, 2014

(65) Prior Publication Data

US 2014/0144742 A1    May 29, 2014

Related U.S. Application Data

(63) Continuation-in-part of application No. PCT/EP2012/002994, filed on Jul. 17, 2012.

(30) Foreign Application Priority Data

Aug. 6, 2011   (DE) .......................... 10 2011 109 702

(51) Int. Cl.
| | |
|---|---|
| F16H 45/02 | (2006.01) |
| F16D 33/18 | (2006.01) |
| B60K 6/26 | (2007.10) |
| B60K 6/387 | (2007.10) |
| B60K 6/405 | (2007.10) |
| B60K 6/48 | (2007.10) |

(Continued)

(52) U.S. Cl.
CPC . *F16D 33/18* (2013.01); *B60K 6/26* (2013.01); *B60K 6/387* (2013.01); *B60K 6/405* (2013.01); *B60K 6/48* (2013.01); *F16H 41/24* (2013.01); *F16H 45/02* (2013.01); *F16H 2045/002* (2013.01); *F16H 2045/0284* (2013.01); *Y02T 10/6221* (2013.01)
USPC ....................................................... 192/3.26

(58) Field of Classification Search
CPC ... F16D 33/18; F16D 25/061; F16D 25/0635; F16D 25/10; F16H 2045/002; F16H 2045/021
See application file for complete search history.

(56) References Cited

U.S. PATENT DOCUMENTS

| 7,017,693 B2 | 3/2006 | Omote et al. |
| 2001/0013731 A1 | 8/2001 | Shinohara et al. |

(Continued)

FOREIGN PATENT DOCUMENTS

| DE | 102 21 625 | 10/2003 |
| DE | 10 2009 022 272 | 12/2009 |

(Continued)

*Primary Examiner* — Ramya Burgess
*Assistant Examiner* — Huan Le
(74) *Attorney, Agent, or Firm* — Klaus J. Bach

(57) ABSTRACT

In a torque converter device for a motor vehicle having a single-piece housing element which, for drivingly interconnecting a torque converter and an internal combustion engine, wherein the housing element forms a disk carrier accommodating at least one disk of a separating clutch which is provided for mechanically connecting and disconnecting the internal combustion engine to and from the torque converter device, the housing element is provided with at least one actuating piston receptacle forming a pressure chamber with an actuating piston disposed therein for actuating the separating clutch.

9 Claims, 3 Drawing Sheets

(51) Int. Cl.
*F16H 41/24* (2006.01)
*F16H 45/00* (2006.01)

(56) References Cited

U.S. PATENT DOCUMENTS

2005/0133328 A1  6/2005  Masuya
2005/0155831 A1  7/2005  Masuya
2011/0114433 A1*  5/2011  Hattori et al. ............... 192/3.29

FOREIGN PATENT DOCUMENTS

| | | |
|---|---|---|
| DE | 10 2009 038 198 | 3/2010 |
| DE | 10 2009 040 367 | 4/2010 |
| DE | 11 2009 001 077 | 3/2011 |
| EP | 0 308 072 | 3/1989 |
| EP | 1 900 468 | 3/2008 |
| JP | 2009001127 | 1/2009 |
| WO | WO 2011074662 A1 * | 6/2011 |

* cited by examiner

TORQUE CONVERTER DEVICE FOR A MOTOR VEHICLE

This is a Continuation-In-Part application of pending international patent application PCT/2012/002944 filed Jul. 17, 2012 and claiming the priority of German patent application 10 2011 109 702.7 filed Aug. 6, 2011.

BACKGROUND OF THE INVENTION

The invention relates to a torque converter device having a single-piece housing element with a disk carrier including at least one disk of a clutch for connecting the engine to, or disconnecting it from, the torque converter.

A torque converter device for a hybrid motor vehicle having a housing element, which is designed as a single piece and which is provided for connecting a torque converter and an internal combustion engine to one another in a driving manner, is already known from DE 10 2009 042 050 A1. The housing element forms a disk carrier for accommodating a disk of a converter lock-up clutch.

The principal object of the present invention is to provide an inexpensive torque converter device which may be manufactured in a particularly simple manner.

SUMMARY OF THE INVENTION

In a torque converter device for a motor vehicle having a single-piece housing element which, for drivingly interconnecting a torque converter and an internal combustion engine, wherein the housing element forms a disk carrier accommodating at least one disk of a separating clutch which is provided for mechanically connecting and disconnecting the internal combustion engine to and from the torque converter device, the housing element is provided with at least one actuating piston receptacle forming a pressure chamber with an actuating piston disposed therein for actuating the separating clutch.

The housing element forms at least one disk carrier structure for accommodating at least one disk of a converter lock-up clutch. A fully integrated disk carrier may thus be provided, so that the torque converter device may be simplified. As a result, at least one connecting point may easily be dispensed with, so that it is possible to reduce the complexity of the torque converter device, simplify assembly, and/or save on costs, weight, and required installation space. The inertia of components of the torque converter device is also reduced in a particularly simple manner, so that the efficiency of the torque converter device is increased. An inexpensive torque converter device may thus be provided which is particularly easy to manufacture. The term "in one piece" is understood in particular to mean a design as a single component and/or formed in a single piece. A "housing element" is understood in particular to mean a component which includes at least one component of the torque converter device and/or which at least essentially defines an outer periphery and/or an axial extent of the torque converter device. A "disk carrier" is understood in particular to mean a component that is provided for supporting at least one disk of a friction clutch in a rotationally fixed and axially displaceable manner. The torque converter device is preferably provided for a hybrid motor vehicle. A "converter lock-up clutch" is understood in particular to mean a clutch that is provided for directly mechanically connecting an electric motor and/or the internal combustion engine to a transmission input shaft in at least one operating state. In the present context, the term "directly mechanically" is understood in particular to mean that a torque is mechanically transmitted from the electric motor and/or from the internal combustion engine to the transmission input shaft, thereby preventing hydrodynamic transmission by the torque converter and thus bypassing the torque converter. The term "provided" is understood in particular to mean specially designed, equipped, and/or situated.

The disk carrier is in the form of an outer disk carrier for accommodating at least one disk of the converter lock-up clutch. Assembly may be further simplified in this way.

In one embodiment according to the invention, the disk carrier is provided for accommodating a disk package. A particularly effective converter lock-up clutch may be provided in this way. A "disk package" is understood in particular to mean a unit which includes at least two disks and advantageously at least three disks.

It is further proposed according to the invention that the housing element forms at least one actuating piston receptacle which is provided for forming, at least together with an actuating piston, a pressure chamber for actuating the converter lock-up clutch. As a result, at least one further connecting point may be omitted, thus further simplifying the manufacture of the torque converter device and further reducing inertia. A "pressure chamber" is understood in particular to mean a chamber which may be acted on hydraulically and/or pneumatically, and which includes at least one stationary wall and at least one movable wall. An "actuating piston" is understood in particular to mean a component which is provided for axially displacing at least one disk of a clutch in the disk carrier, preferably via an axial movement. The actuating piston receptacle is preferably provided for guiding the actuating piston.

In particular, it is advantageous for the housing element to form at least one disk carrier for accommodating at least one disk of a separating clutch which is provided for mechanically decoupling an electric motor and the internal combustion engine from one another in at least one operating state. As a result of providing the disk carrier of the separating clutch and the disk carrier of the converter lock-up clutch via the one-piece housing element, a particularly advantageous fully integrated disk carrier may be provided, so that the torque converter device may be further simplified. The one-piece housing element preferably forms the disk carrier for the converter lock-up clutch and the disk carrier for the separating clutch. The disk carrier for the converter lock-up clutch and the disk carrier for the separating clutch are advantageously formed by the same housing element, and in particular are connected to one another in a manner that is free of connecting points. The disk carrier is preferably designed as an outer disk carrier for accommodating at least one disk of the separating clutch. The disk carrier of the separating clutch which is formed by the housing element is advantageously provided for accommodating a disk package.

It is also advantageous for the housing element to form at least one actuating piston receptacle which is designed to form, together with an actuating piston, a pressure chamber for actuating the separating clutch. As a result, at least one further connecting point may be omitted, thus further simplifying the manufacture of the torque converter device and further reducing inertia. The one-piece housing element preferably forms the actuating piston receptacle for the converter lock-up clutch and the actuating piston receptacle for the separating clutch. The actuating piston receptacle for the converter lock-up clutch and the actuating piston receptacle for the separating clutch are advantageously formed by the same housing element.

It is further proposed that the torque converter device includes at least one torque converter having a pump impeller and at least one positive-fit connection which is provided for connecting the pump impeller and the housing element to one another in a positive-fit manner. A particularly advantageous torque converter device may be provided in this way.

It is further proposed that the positive-fit connection has at least one screw element and/or one rivet element. The pump impeller and the housing element may thus be connected to one another in a particularly simple manner.

In one advantageous embodiment, the torque converter device has a rotor support, and a plug-in connection which connects the housing element and the rotor support to one another in a torque-transmitting manner. A particularly advantageous torque converter device may be provided in this way. In addition, the electric motor may thus be centered in a particularly simple manner. A "rotor support" is understood in particular to mean a component which is permanently connected to a rotor of the electric motor in a rotationally fixed manner, and which thus has the same rotational speed as the rotor.

It is further proposed that the housing element is designed as a cast and/or sintered component. The housing element may thus be manufactured as a one-piece component in a particularly simple manner, in particular in one work step, so that manufacture of the torque converter device is further simplified. A "cast component" is understood in particular to mean a solid component that is produced by means of casting. The shape of the solid cast component is preferably determined at least essentially by a casting process, whereby the shape of the solid cast component may be adapted by machining, for example by drilling, milling, turning, grinding, and/or a similar process. A "sintered component" is understood in particular to mean a solid component that is produced by sintering. The shape of the solid sintered component is preferably determined at least essentially by a sintering process, whereby the shape of the solid sintered component may be adapted by machining, for example by drilling, milling, turning, grinding, and/or a similar process. The solid cast component and/or the solid sintered component may advantageously form a solid material from which the housing element is produced, in particular by machining. The shape of the solid cast component and of the solid sintered component is preferably determined by means of a process that is different from a forming process. The cast component and/or sintered component in particular is/are not metal components, in particular not shaped sheet metal components.

It is further proposed that the housing element is formed at least essentially from a light alloy. The weight of the torque converter device may thus be reduced in a particularly simple manner. The term "formed from a light alloy" is understood in particular to mean that the housing element is cast and/or sintered from a light alloy. The term "at least essentially" is understood in particular to mean that the housing element is formed either completely or essentially from a light alloy. The term "essentially" is understood in particular to mean that the housing element is formed from at least 80%, advantageously at least 90% and particularly advantageously at least 95%, light alloy.

In one particularly advantageous embodiment, the housing element contains aluminum and/or magnesium. A particularly advantageous material may thus be used for forming the housing element. In the present context, the term "contain" is understood in particular to mean that the housing element is formed from aluminum or from magnesium, or from an alloy of aluminum and magnesium.

The invention will become more readily apparent from the following description with reference to the accompanying drawings. Six exemplary embodiments of the invention are illustrated in the drawings. The drawings, the description, and the claims contain numerous features in combination which may be considered individually or in meaningful combinations.

DESCRIPTION OF EXEMPLARY EMBODIMENTS

Figure 1:
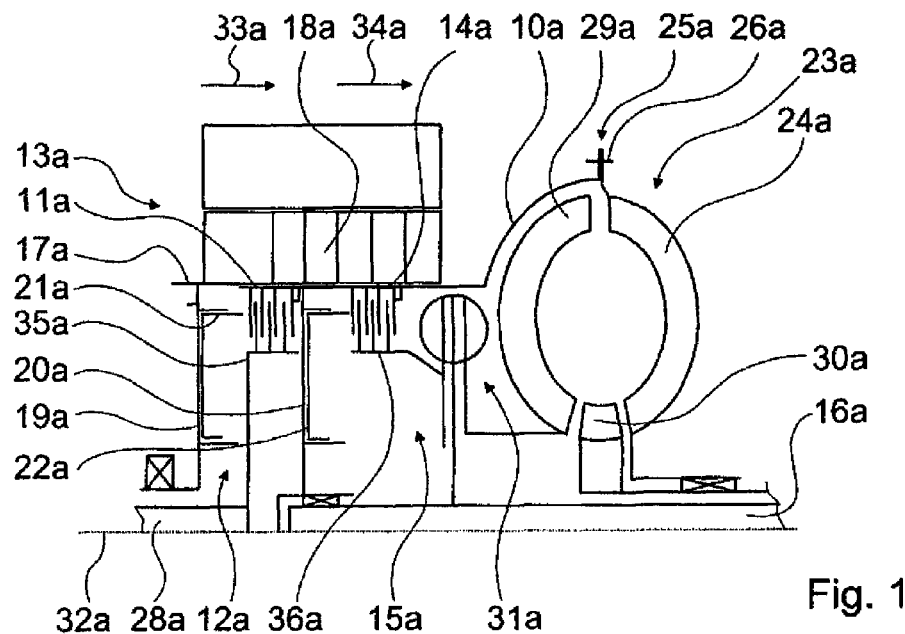
FIG. 1 schematically shows a torque converter device for a hybrid motor vehicle.

FIG. 1 schematically shows a torque converter device of a motor vehicle. The torque converter device is a hydrodynamic torque converter device. For providing a drive torque, the motor vehicle has an electric motor 13a and an internal combustion engine, not illustrated in greater detail, which either individually or in combination drive the drive wheels of the motor vehicle. The electric motor 13a and the internal combustion engine are situated upstream from the torque converter device with respect to a power flow. The electric motor 13a has a rotor 18a, and the internal combustion engine has an internal combustion engine output shaft 28a, for connection to the torque converter device. For providing multiple transmission gears, the torque converter device has a transmission, not illustrated in greater detail, which is situated in the power flow downstream from the torque converter device. The transmission has a transmission input shaft 16a for connection to the torque converter device. The internal combustion engine output shaft 28a is a crankshaft of the internal combustion engine. The motor vehicle is designed as a hybrid motor vehicle.

The torque converter device also has a hydrodynamic torque converter 23a. The torque converter 23a is designed as a start-up element, and has a pump impeller 24a, a turbine wheel 29a, and a stator 30a. The impeller 24a is permanently connected to the rotor 18a of the electric motor 13a, and is connectable to the internal combustion engine output shaft 28a. The turbine wheel 29a is permanently connected to the transmission input shaft 16a via a vibration damper 31a.

The torque converter device also has a separating clutch 12a which is provided for mechanically decoupling the electric motor 13a and the internal combustion engine from one another in one operating state, and for mechanically coupling the electric motor 13a and the internal combustion engine to one another in another operating state. The separating clutch 12a is provided for mechanically connecting and mechanically disconnecting the internal combustion engine to/from the torque converter device. For the mechanical coupling, the separating clutch 12a, the clutch 12a is provided for mechanically connecting the internal combustion engine output shaft 28a to the rotor 18a, and, for the mechanical decoupling, the clutch 12a is provided for mechanically disconnecting the internal combustion engine output shaft 28a from the rotor 18a. The separating clutch 12a is a multi-disk clutch, and has two disk packages for connecting the internal combustion engine output shaft 28*a* to the rotor 18*a*. Each disk package includes multiple disks situated next to one another. The two disk packages partially engage with one another. One disk package is connected to the rotor 18*a* for rotation therewith, and the other disk package is connected to the internal combustion engine output shaft 28*a* for rotation therewith. The disk package which is connected for rotation with the rotor 18*a* is designed as an outer disk package. The disk package which is connected for rotation with the internal combustion engine output shaft 28*a* is an inner disk package. In principle, the separating clutch 12*a* may also have only one disk.

For the direct mechanical connection of the electric motor 13*a* and/or of the internal combustion engine to the transmission input shaft 16*a*, the torque converter device has a converter lock-up clutch 15*a*. In another operating state the converter lock-up clutch 15*a* is provided for connecting the electric motor 13*a* and/or the internal combustion engine to the transmission input shaft 16*a* via the torque converter 23*a*. The converter lock-up clutch 15*a* is provided for bypassing the torque converter 23*a*. The converter lock-up clutch 15*a* is provided for bridging the torque converter 23*a* in economically inefficient operating periods. The converter lock-up clutch 15*a* is provided for mechanically connecting the electric motor 13*a* and/or the internal combustion engine to the transmission input shaft 16*a*, i.e., via the vibration damper 31*a*, and for hydraulically connecting the electric motor 13*a* and/or the internal combustion engine to the transmission input shaft 16*a*, i.e., via the torque converter 23*a*. The converter lock-up clutch 15*a* is provided for mechanically connecting the rotor 18*a* to the transmission input shaft 16*a* via the vibration damper 31*a*, and for hydraulically connecting rotor 18*a* to the transmission input shaft 16*a* via the torque converter 23*a*. The converter lock-up clutch 15*a* is a multi-disk clutch, and has two disk packages for connecting the rotor 18*a* to the vibration damper 31*a*. Each disk package includes multiple disks situated next to one another. The two disk packages partially engage with one another. One disk package is connected to the rotor 18*a* for rotation therewith, and the other disk package is connected to an input of the vibration damper 31*a* for rotation therewith. The disk package which is connected for rotation with the rotor 18*a* is an outer disk package. The disk package which is connected for rotation with the input of the vibration damper is an inner disk package. In principle, the converter lock-up clutch 15*a* may also have only one disk.

For supporting the disk packages of the separating clutch 12*a*, the torque converter device has a disk carrier 11*a* and a disk carrier 35*a*. The disk carrier 11*a*, which is provided for accommodating the disks of the separating clutch 12*a*, is in the form of an outer disk carrier. The disk carrier 35*a* is an inner disk carrier. The disk carrier 11*a* supports the disks of the disk package of the separating clutch 12*a*, which disks are connected to the rotor 18*a* for rotation therewith They are axially movable outer disks of the separating clutch 12*a*. The disk carrier 35*a* supports the disks of the disk package of the separating clutch 12*a*, which are connected to the internal combustion engine output shaft 28*a* for rotation therewith and which are axially movable inner disks of the separating clutch 12*a*.

For supporting the disk packages of the converter lock-up clutch 15*a*, the torque converter device has a disk carrier 14*a* and a disk carrier 36*a*. The disk carrier 14*a*, which is provided for accommodating the disks of the converter lock-up clutch 15*a*, is an outer disk carrier. The disk carrier 36*a* is an inner disk carrier. The disk carrier 14*a* supports the disks of the disk package of the converter lock-up clutch 15*a*, which are connected to the rotor 18*a* for rotation therewith, in an axially movable manner, and supports outer disks of the converter lock-up clutch 15*a*. The disk carrier 36*a* supports the disks of the disk package of the converter lock-up clutch 15*a*, which are connected to the input of the vibration damper 31*a* for rotation therewith and are axially movably supported.

The torque converter device includes a one-piece housing element 10*a* formed together with the disk carrier 11*a* for the separating clutch 12*a* and the disk carrier 14*a* for the converter lock-up clutch 15*a*. The housing element 10*a* connects the torque converter 23*a* and the internal combustion engine to one another in a driving manner. The housing element 10*a* forms the disk carrier 11*a* and the disk carrier 14*a*. The disk carriers 11*a*, 14*a* are formed in one piece via the housing element 10*a*. The clutches 12*a* and 15*a* are situated within the housing element 10*a* which forms the disk carriers 11*a*, 14*a*.

The one-piece housing element 10*a* forms the disk carrier 11*a*, which is provided for accommodating the outer disk package of the separating clutch 12*a*, and forms the disk carrier 14*a*, which is provided for accommodating the outer disk package of the converter lock-up clutch 15*a*. The housing element 10*a* movably accommodates the disk packages of the separating clutch 12*a* and of the converter lock-up clutch 15*a* in an axially movable manner, i.e., along a rotational axis 32*a* of the torque converter device, which is connected to the rotor 18*a* of the electric motor 13*a* in a rotationally fixed manner. The one-piece housing element 10*a* forms an outer disk carrier of the separating clutch 12*a*, and forms an outer disk carrier of the converter lock-up clutch 15*a*. The outer disk package of the separating clutch 12*a* and the outer disk package of the converter lock-up clutch 15*a* are situated on the shared housing element 10*a* in a rotationally fixed manner. In principle, the disk carrier 11*a* and/or the disk carrier 14*a* may be provided solely for accommodating a disk.

The torque converter device has a tubular rotor support 17*a* for accommodating the rotor 18*a*. The tubular rotor support 17*a* supports the rotor 18*a* of the electric motor 13*a*. The torque converter device has a plug-in connection for connecting the housing element 10*a* and the rotor support 17*a* in a torque-transmitting manner. The one-piece housing element 10*a* and the rotor support 17*a* are permanently connected to one another in a rotationally fixed manner by means of the plug-in connection. The disk carriers 11*a*, 14*a* are thus permanently connected to the rotor 18*a* in a rotationally fixed manner by means of the plug-in connection. The rotor support 17*a* is made of steel. In principle, however, the housing element 10*a* may also form the rotor support 17*a*, at least partially, whereby the rotor support 17*a* and the housing element 10*a* may be formed in one piece.

The torque converter device has an actuating piston receptacle 20*a* for actuating the converter lock-up clutch 15*a*. The one-piece housing element 10*a* forms the actuating piston receptacle 20*a* for actuating the converter lock-up clutch 15*a*. The actuating piston receptacle 20*a* formed by the housing element 10*a* forms a hydraulic pressure chamber for actuating the converter lock-up clutch 15*a* via an actuating piston 22*a* of the torque converter device. The housing element 10*a* thus forms an actuating piston guide. The actuating piston receptacle 20*a* has a partition wall. The partition wall of the actuating piston receptacle 20*a* is designed in one piece with the housing element 10*a*. The housing element 10*a* thus forms the partition wall of the actuating piston receptacle 20*a* in addition to the disk carriers 11*a*, 14*a*. The disk carriers 11*a*, 14*a* and the partition wall of the actuating piston receptacle 20*a* are formed in one piece via the housing element 10*a*. The partition wall of the actuating piston receptacle 20*a* is designed as a stationary wall of the pressure chamber formed by the actuating piston receptacle 20*a* and the actuating piston 22a. The actuating piston 22a forms a movable wall of the pressure chamber formed by the actuating piston receptacle 20a and the actuating piston 22a. The action of an operating material on the pressure chamber formed by the actuating piston receptacle 20a and the actuating piston 22a results in an axial actuating force which moves the actuating piston 22a in an axial actuating direction 34a, as the result of which the actuating piston 22a axially moves a disk of the outer disk package of the converter lock-up clutch 15a in the actuating direction 34a, and presses together the disks of the two disk packages of the converter lock-up clutch 15a. As a result, the converter lock-up clutch 15a is closed and the torque converter 23a is bypassed. The operating material is provided as oil.

The torque converter device has an actuating piston receptacle 19a for actuating the separating clutch 12a. The rotor support 17a forms the actuating piston receptacle 19a far actuating the separating clutch 12a The actuating piston receptacle 19a forms a hydraulic pressure chamber for actuating the separating clutch 12a by means of an actuating piston 21a of the torque converter device. The actuating piston receptacle 19a has a partition wall. The partition wall of the actuating piston receptacle 19a is designed in one piece with the rotor support 17a. The rotor support 17a thus forms the partition wall of the actuating piston receptacle 19a. The partition wall of the actuating piston receptacle 19a is designed as a stationary wall of the pressure chamber formed by the actuating piston receptacle 19a and the actuating piston 21a. The actuating piston 21a forms a movable wall of the pressure chamber formed by the actuating piston receptacle 19a and the actuating piston 21a. The action of an operating material on the pressure chamber formed by the actuating piston receptacle 19a and the actuating piston 21a results in an axial actuating force which moves the actuating piston 21a in an axial actuating direction 33a, as the result of which the actuating piston 21a axially moves a disk of the outer disk package of the separating clutch 12a in the actuating direction 33a, and presses together the disks of the two disk packages of the separating clutch 12a. As a result, the separating clutch 12a is closed and the internal combustion engine output shaft 28a is connected to the rotor 18a.

The actuating piston receptacle 19a provides the axial actuating direction 33a in which the actuating piston 21a is moved for engaging the separating clutch 12a. The actuating piston receptacle 20a provides the axial actuating direction 34a in which the actuating piston 22a is moved for engaging the converter lock-up clutch 15a. In this exemplary embodiment, the actuating directions 33a, 34a have the same orientation, and point in the same direction with a mutually parallel orientation. The two actuating directions 33a, 34a each point in the direction of the torque converter 23a. Thus, the actuating pistons 21a, 22a each face the torque converter 23a, the actuating piston 21a facing the actuating piston 22a and the actuating piston 22a facing away from the actuating piston 21a.

The actuating piston receptacle 19a is situated in front of the separating clutch 12a along the rotational axis 32a. The actuating piston receptacle 20a is situated behind the separating clutch 12a and in front of the converter lock-up clutch 15a along the rotational axis 32a. The actuating piston receptacle 20a is situated along the rotational axis 32a, between the separating clutch 12a and the converter lock-up clutch 15a.

The housing element 10a thus forms the disk carriers 11a, 14a and the actuating piston receptacle 20a. The disk carriers 11a, 14a and the actuating piston receptacle 20a are designed as one piece and are free of connecting points, i.e., connected to one another without a connecting point. The partition wall of the actuating piston receptacle 19a and the partition wall of the actuating piston receptacle 20a are separate from one another, and situated at a distance from one another. The partition wall of the actuating piston receptacle 20a is situated along the rotational axis 32a, between the separating clutch 12a and the converter lock-up clutch 15a.

For permanently connecting the housing element 10a and thus the rotor 18a to the pump impeller 24a, the torque converter device has a single positive-fit connection 25a which connects the pump impeller 24a and the housing element 10a to one another in a positive-fit manner. The positive-fit connection 25a thus connects the pump impeller 24a to the disk carrier 11a, to the disk carrier 14a, to the actuating piston receptacle 19a, to the actuating piston receptacle 20a, and to the rotor support 17a in a positive-fit manner. For connecting the two disk carriers 11a, 14a, the two actuating piston receptacles 19a, 20a, and the rotor support 17a to the pump impeller 24a, the torque converter device has only one connecting point, designed as the positive-fit connection 25a, and one connecting point designed as the plug-in connection. For connecting the two disk carriers 11a, 14a and the actuating piston receptacle 20a to the pump impeller 24a, the torque converter device has only a single connecting point, designed as the positive-fit connection 25a. The housing element 10a and the pump impeller 24a are connected to one another in a positive-fit manner. The positive-fit connection 25a has a screw element 26a for the positive-fit connection of the housing element 10a and the pump impeller 24a. The housing element 10a and the pump impeller 24a are thus connected to one another in a positive-fit manner by means of the screw element 26a, and are screwed together.

For the one-piece design, the housing element 10a is designed as a cast component. The housing element is cast in one piece. The two disk carriers 11a, 14a and the actuating piston receptacle 20a or the partition wall of the actuating piston receptacle 20a are formed by the cast component in a casting process. In principle, the housing element 10a may also be designed as a sintered component.

The housing element 10a is made of a light alloy in order to reduce weight. The disk carriers 11a, 14a and the actuating piston receptacle 20a or the partition wall of the actuating piston receptacle 20a are made of a light alloy. In this exemplary embodiment, the housing element 10a and thus the disk carriers 11a, 14a and the actuating piston receptacle 20a contain aluminum. The housing element 10a is cast from aluminum. The housing element 10a is designed as a cast aluminum part. Thus, the disk carriers 11a, 14a and the actuating piston receptacle 20a are cast from aluminum and thus formed as the same cast aluminum part. In principle, the housing element 10a may alternatively or additionally contain magnesium. The housing element may in principle be designed as a cast magnesium part or as a cast aluminum-magnesium part.

FIGS. 2 through 6 show five further exemplary embodiments of the invention. The following description is limited essentially to the differences between the exemplary embodiments, whereby reference may be made to the description of the other exemplary embodiment, in particular in FIG. 1, with regard to components, features, and functions which remain the same. To distinguish the exemplary embodiments, the letter "a" in the reference numerals of the exemplary embodiment in FIG. 1 is replaced by the letters "b," "c," "d" "e" and "f" in the reference numerals of the exemplary embodiments in FIGS. 2 through 6, respectively. With regard to components which are referred to in the same way, in particular with regard to components having the same reference numeral, reference may basically be made to the drawing and/or the description of the exemplary embodiment in FIG. 1.

Figure 2:
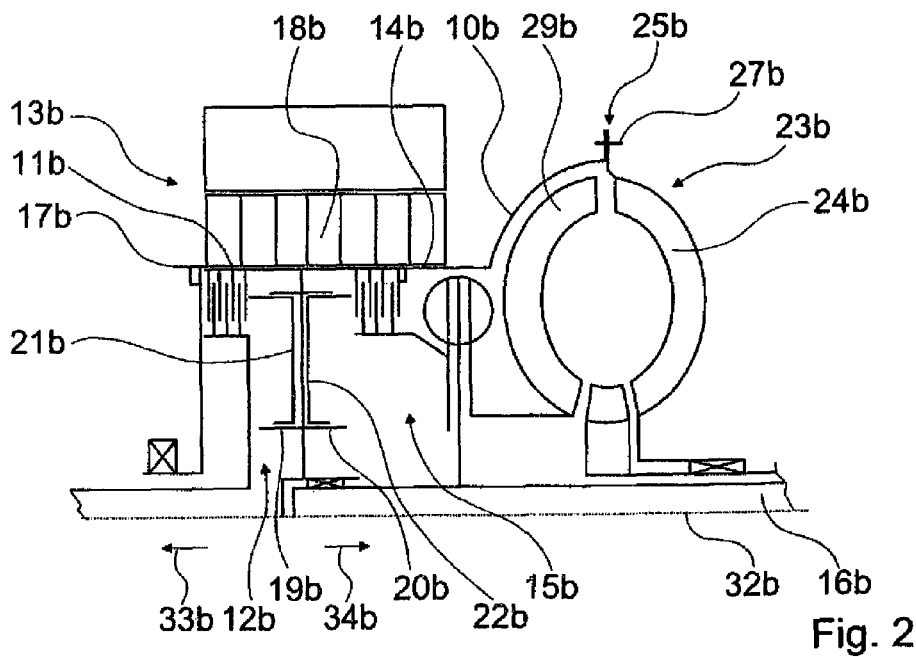
FIG. 2 shows an alternative design of a torque converter device for a hybrid motor vehicle in a schematic illustration.

FIG. 2 shows an alternative design of a torque converter device of a motor vehicle, having at least one one-piece housing element 10b which forms a disk carrier 11b for accommodating multiple disks of a separating clutch 12b, a disk carrier 14b for accommodating multiple disks of a converter lock-up clutch 15b, and an actuating piston receptacle 20b for accommodating an actuating piston 22b. In addition, the torque converter device has a rotor support 17b for accommodating a rotor 18b of an electric motor 13b, and a torque converter 23b whose pump impeller 24b is connected to the housing element 10b by means of a positive-fit connection 25b, and whose turbine wheel 29b is connected to a transmission input shaft 16b.

In contrast to the preceding exemplary embodiment, the positive-fit connection 25b has a rivet element 27b for the positive-fit connection of the pump impeller 24b to the housing element 10b. The housing element 10b and the pump impeller 24b are thus connected to one another in a positive-fit manner by means of the rivet element 27b, whereby, in addition to the positive-fit connection, a force-fit connection is also established via the rivet element 27b. The housing element and the pump impeller are riveted together. The rivet element 27b is additionally welded. The housing element 10b and the pump impeller 24b are thus connected to one another in a positive-fit manner by means of a welded rivet.

In addition, in contrast to the preceding exemplary embodiment, the housing element 10b forms the actuating piston receptacle 20b for accommodating the actuating piston 22b, and forms an actuating piston receptacle 19b for accommodating an actuating piston 21b. The actuating piston receptacle 19b and the actuating piston receptacle 20b have a shared partition wall. The shared partition wall of the actuating piston receptacles 19b, 20b is situated along a rotational axis 32b, between the separating clutch 12b and the converter lock-up clutch 15b. The partition wall is designed as a stationary wall of a pressure chamber formed by the actuating piston receptacle 19b and the actuating piston 21b, and as a stationary wall of a pressure chamber formed by the actuating piston receptacle 20b and the actuating piston 22b.

In this exemplary embodiment, the actuating piston receptacles 19b, 20b provide actuating directions 33b, 34b, respectively, which have opposite orientations. The actuating directions point in opposite directions and are oriented in parallel to one another. The two actuating directions 33b, 34b face away from one another. The actuating direction 33b of the actuating piston receptacle 19b points away from the torque converter 23b and faces away from same. The actuating direction 34b of the actuating piston receptacle 20b points in the direction of the torque converter 23b and faces same. Thus, the actuating piston 21b faces away from the torque converter 23b, and the actuating piston 22b faces the torque converter 23b. The actuating pistons 21b, 22b face away from one another. Both of the actuating piston receptacles 19b, 20b are situated along the rotational axis 32b, between the separating clutch 12b and the converter lock-up clutch 15b.

In contrast to the preceding exemplary embodiment, for the one-piece design the housing element 10b is designed as a sintered component. The housing element 10b is sintered in one piece, and is sintered for the manufacture. The two disk carriers 11b, 14b and the two actuating piston receptacles 19b, 20b, and thus the partition walls, are formed by the sintered component, and are formed by a sintering process. In principle, the housing element 10b may also be designed as a cast component.

In contrast to the preceding exemplary embodiment, the housing element 10b and thus the disk carriers 11b, 14b and the actuating piston receptacles 19b. 20b contain magnesium. The housing element 10b is sintered from magnesium. The housing element 10b is designed as a sintered magnesium part. Thus, the disk carriers 11b, 14b and the actuating piston receptacles 19b, 20b are sintered from magnesium and thus as the same sintered magnesium part. In principle, the housing element 10b may alternatively or additionally contain aluminum. The housing element may in principle be designed as a sintered aluminum part or as a sintered aluminum-magnesium part.

Figure 3:
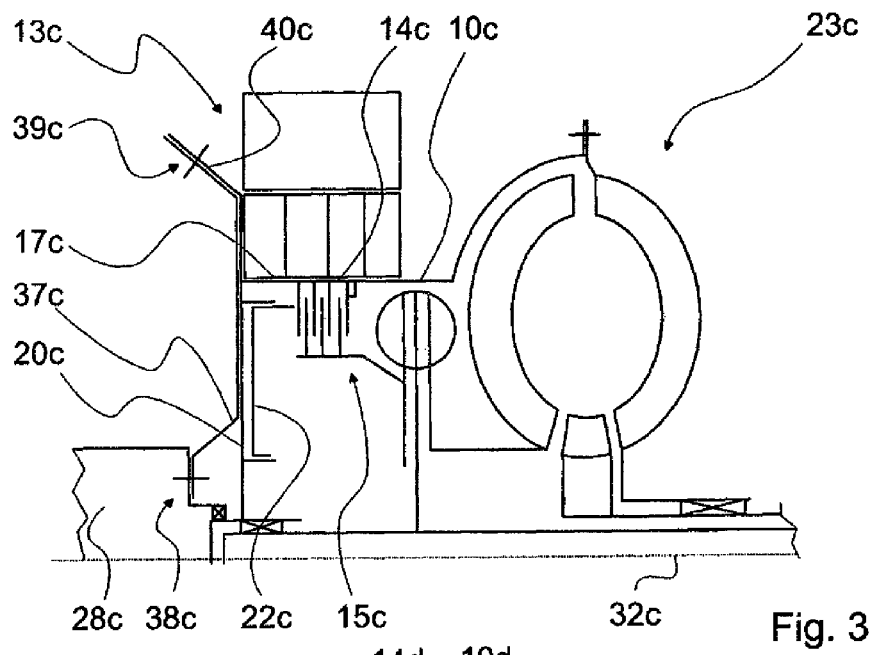
FIG. 3 shows a third exemplary embodiment of a torque converter device for a hybrid motor vehicle.

FIG. 3 illustrates a third exemplary embodiment of a torque converter device of a motor vehicle according to the invention. In contrast to the preceding exemplary embodiments, an internal combustion engine and an electric motor 13c are permanently mechanically coupled to one another. An internal combustion engine output shaft 28c of the internal combustion engine and a rotor support 17c of the electric motor 13c are permanently mechanically connected to one another. The torque converter device has no separating clutch.

The torque converter device has a one-piece housing element 10c which is provided for connecting a torque converter 23c and the internal combustion engine to one another in a driving manner. The housing element 10c forms a disk carder 14c, designed as an outer disk carrier, for accommodating multiple disks of a converter lock-up clutch 15c. The disk carrier 14c accommodates a disk package. The housing element 10c also forms an actuating piston receptacle 20c which together with an actuating piston 22c forms a pressure chamber for actuating the converter lock-up clutch 15c. The housing element 10c is designed as a cast component formed from a light alloy, and contains aluminum and/or magnesium. In principle, the housing element 10c may also be designed as a sintered component.

For the mechanical connection of the internal combustion engine output shaft 28c to the rotor support 17c, the torque converter device has a plug-in connection and a flexible plate connection. The plug-in connection connects the housing element 10c and the rotor support 17c to one another in a torque-transmitting manner. The plug-in connection mechanically connects the housing element 10c and the rotor support 17c to one another. The flexible plate connection connects the housing element 10c and the internal combustion engine output shaft 28c to one another in a torque-transmitting manner. The flexible plate connection mechanically connects the housing element 10c and the internal combustion engine output shaft 28c to one another. The flexible plate connection has a flexible plate 37c. For the positive-fit connection of the flexible plate 37c to the internal combustion engine output shaft 28c, the flexible plate connection has a positive-fit connection 38c, and for the positive-fit connection of the flexible plate 37c to the housing element 10c has a positive-fit connection 39c. The positive-fit connections 38c, 39c each have at least one screw element which connects the housing element 10c to the internal combustion engine output shaft 28c in a positive-fit manner. In principle, the positive-fit connections 38c, 39c may additionally or alternatively have at least one rivet element.

For the positive-fit connection of the housing element 10c to the flexible plate 37c and thus to the internal combustion engine output shaft 28c, the housing element 10c forms a flexible plate connecting element 40c. The flexible plate connecting element 40c and the housing element 10c have a one-piece design. The housing element 10c forms the flexible plate connecting element 40c. The positive-fit connection 39c connects the flexible plate connecting element 40c to the flexible plate 37c in a positive-fit manner. The flexible plate connecting element 40c has a two-part progression. A first portion of the flexible plate connecting element 40c extends radially outwardly with respect to a rotational axis 32c, i.e., in a direction facing away from the rotational axis 32c, before a subsequent, second portion of the flexible plate connecting element 40c bends and extends partially axially in the direction of the internal combustion engine and partially radially outwardly with respect to the rotational axis 32c. Of course, the flexible plate connecting element 40c and the housing element 10c may also be separate from one another, being permanently mechanically connected to one another by means of at least one screw element, for example.

Figure 4:
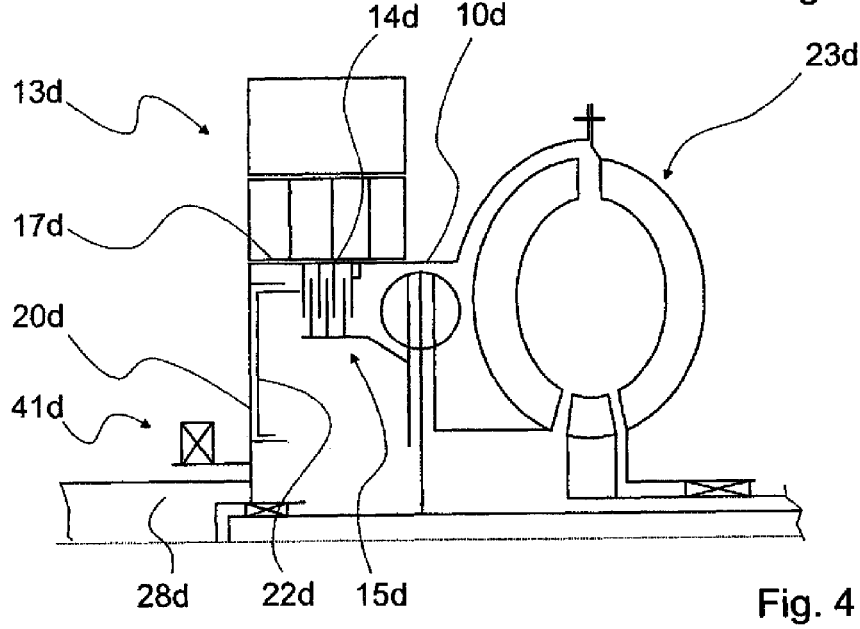
FIG. 4 shows a fourth exemplary embodiment of a torque converter device for a hybrid motor vehicle.

FIG. 4 illustrates a fourth exemplary embodiment of a torque converter device of a motor vehicle according to the invention. The torque converter device has a one-piece housing element 10d which is provided for connecting a torque converter 23d and the internal combustion engine to one another in a driving manner. The housing element 10d forms a disk carrier 14d, designed as an outer disk carrier, for accommodating multiple disks of a converter lock-up clutch 15d The disk carrier 14d accommodates a disk package. The housing element 10d also forms an actuating piston receptacle 20d which together with an actuating piston 22d forms a pressure chamber for actuating the converter lock-up clutch 15d. The torque converter device has an electric motor 13d together with a rotor support 17d for providing an electric drive torque. The housing element 10d is designed as a cast component formed from a light alloy. The housing element contains aluminum and/or magnesium. In principle, the housing element 10c may also be designed as a sintered component. In contrast to the preceding exemplary embodiment according to FIG. 3, the torque converter device has a radial bearing 41d for permanently mechanically connecting the housing element 10d to the internal combustion engine, and thus to an internal combustion engine output shaft 28d.

In principle, the housing element 10d may additionally or alternatively be permanently mechanically connected to an internal combustion engine, and thus to the internal combustion engine output shaft 28d, via a flywheel. The flywheel is situated between the internal combustion engine and the housing element 10d with respect to a power flow. The flywheel connects the internal combustion engine output shaft 28d of the internal combustion engine to the housing element 10d. The flywheel is designed as a dual mass flywheel. The flywheel has a primary flywheel mass which is fixedly connected to the internal combustion engine output shaft 28d, and a secondary flywheel mass which is fixedly connected to the housing element 10d. The two flywheel masses are connected to one another by means of a torsional damper. In principle, the housing element 10d may form the secondary flywheel mass of the flywheel, as a result of which the housing element 10d and the flywheel have a one-piece design in part.

Figure 5:
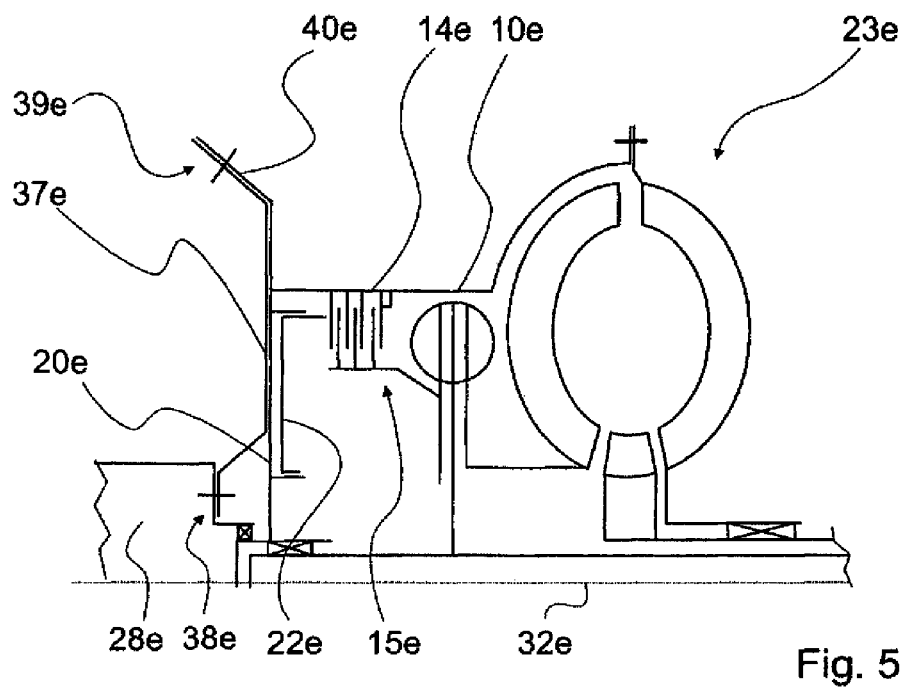
FIG. 5 shows a fifth exemplary embodiment of a torque converter device for a motor vehicle.

FIG. 5 illustrates a fifth exemplary embodiment of a torque converter device of a motor vehicle according to the invention. In contrast to the preceding exemplary embodiments, the motor vehicle is designed as a motor vehicle operated solely by the internal combustion engine. The motor vehicle has only an internal combustion engine for providing a drive torque. The motor vehicle has no electric motor provided for the drive of drive wheels of the motor vehicle.

The torque converter device has a one-piece housing element 10e which is provided for connecting a torque converter 23e and the internal combustion engine to one another in a driving manner. The housing element 10e forms a disk carrier 14e, designed as an outer disk carrier, for accommodating multiple disks of a converter lock-up clutch 15e. The disk carrier 14e accommodates a disk package. The housing element 10e also forms an actuating piston receptacle 20e which together with an actuating piston 22e forms a pressure chamber for actuating the converter lock-up clutch 15e. The housing element 10e is designed as a cast component formed from a light alloy. The housing element contains aluminum and/or magnesium. In principle, the housing element 10e may also be designed as a sintered component.

The torque converter device has a flexible plate connection to the mechanical connection of an internal combustion engine output shaft 28e of the internal combustion engine to the housing element 10e. The flexible plate connection connects the housing element 10e and the internal combustion engine output shaft 28e to one another in a torque-transmitting manner. The flexible plate connection has a flexible plate 37e. The flexible plate connection has a positive-fit connection 38e for the positive-fit connection of the flexible plate 37e to the internal combustion engine output shaft 28e, and has a positive-fit connection 39e for the positive-fit connection of the flexible plate 37e to the housing element 10e. The positive-fit connections 38e, 39e each have at least one screw element which connects the housing element 10e to the internal combustion engine output shaft 28e in a positive-fit manner. In principle, the positive-fit connections 38e, 39e may additionally or alternatively have at least one rivet element.

For the positive-fit connection of the housing element 10e to the flexible plate 37e and thus to the internal combustion engine output shaft 28e, the housing element 10e forms a flexible plate connecting element 40e. The flexible plate connecting element 40e and the housing element 10e have a one-piece design. The positive-fit connection 39e connects the flexible plate connecting element 40e to the flexible plate 37e in a positive-fit manner. The flexible plate connecting element 40e has a two-part progression. A first portion of the flexible plate connecting element 40e extends radially outwardly with respect to a rotational axis 32e, i.e., in a direction facing away from the rotational axis 32e, before a subsequent, second portion of the flexible plate connecting element 40e bends and extends partially axially in the direction of the internal combustion engine and partially radially outwardly with respect to the rotational axis 32e.

Figure 6:
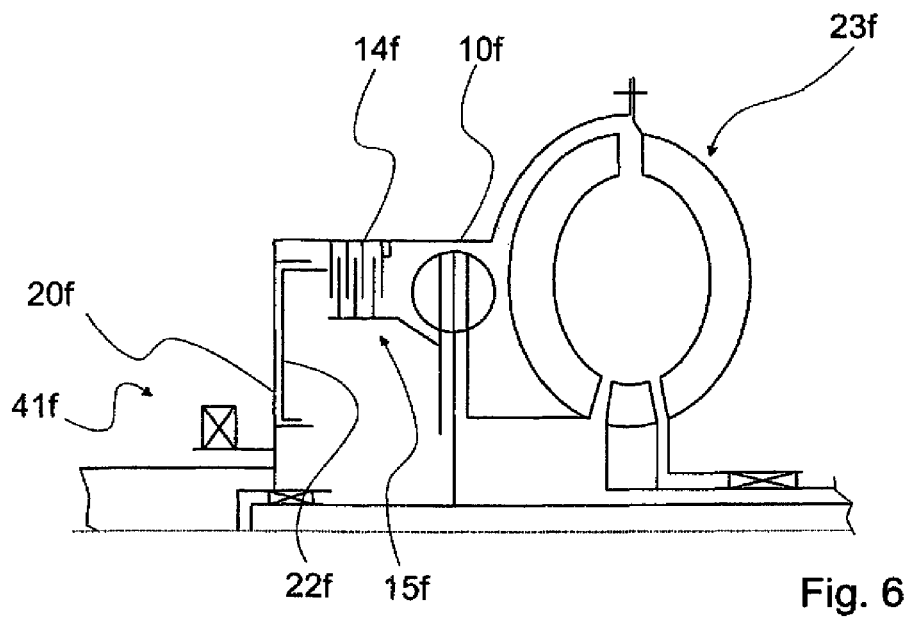
FIG. 6 shows a sixth exemplary embodiment of a torque converter device for a motor vehicle.

FIG. 6 illustrates a sixth exemplary embodiment of a torque converter device of a motor vehicle according to the invention. The torque converter device has a one-piece housing element 10f which is provided for connecting a torque converter 23f and an internal combustion engine to one another in a driving manner. The housing element 10f forms a disk carrier 14f, designed as an outer disk carrier, for accommodating multiple disks of a converter lock-up clutch 15f. The disk carrier 14f accommodates a disk package. The housing element 10f also forms an actuating piston receptacle 20f which together with an actuating piston 22f forms a pressure chamber for actuating the converter lock-up clutch 15f. The housing element 10f is designed as a cast component formed from a light alloy, and contains aluminum and/or magnesium. In principle, the housing element 10e may also be designed as a sintered component. In contrast to the preceding exemplary embodiment according to FIG. 5, the torque converter device has a radial bearing 41d for permanently mechanically connecting the housing element 10f to the internal combustion engine.

What is claimed is:

1. A torque converter device for a motor vehicle, comprising a single-piece housing element (10a; 10b) for drivingly interconnecting a torque converter (23a; 23b) and an internal combustion engine, the housing element (10*a*; 10*b*) forming a tubular disk carrier (11*a*; 11*b*) supporting at its outer circumference a rotor (18*a*, 18*b*) of an electric machine (13*a*, 13*b*) and accommodating at its inside at least one disk of a separating clutch (12*a*; 12*b*) which is provided for mechanically connecting the internal combustion engine to, and disconnecting it from, the torque converter and also at least one disc of a converter lock-up clutch (15*a*) for locking up the torque converter (23, 24), the housing element (10*a*; 10*b*) including further a first actuating piston receptacle (19*a*) for forming together with an actuating piston (21*a*) a pressure chamber for actuating the separating clutch (12*a*, 12*b*) and a second actuating piston receptacle (20*a*; 20*b*) which is provided for forming, together with an actuating piston (22*a*; 22*b*), a pressure chamber for actuating a converter lock-up clutch (15*a*; 15*b*).

2. The torque converter device according to claim 1, wherein, for actuating the converter lock-up clutch (15*a*; 15*b*), the actuating piston receptacle (20*a*; 20*b*) has a partition wall which is formed in one piece with the housing element (10*a*; 10*b*), the partition wall being situated along a rotational axis (32*a*), between the separating clutch (12*a*; 12*b*) and the converter lock-up clutch (15*a*; 15*b*).

3. The torque converter device according to claim 1, comprising further a rotor support (17*a*; 17*b*), and a plug-in connection which connects the housing element (10*a*; 10*b*) and the rotor support (17*a*, 17*b*) to one another in a torque-transmitting manner.

4. The torque converter device according to claim 1, wherein the housing element (10*a*; 10*b*) is in the form of one of a cast and a sintered component.

5. The torque converter device according to claim 1, wherein the housing element (10*a*; 10*b*) consists essentially of a light alloy.

6. The torque converter device according to claim 1, wherein the housing element (10*a*; 10*b*) contains at least one of aluminum and magnesium.

7. The torque converter device according to claim 1, wherein the converter lock-up clutch (15*a*, 15*b*) has an inner disk carrier (36*a*) which is connected to an input of a vibration damper (31*a*) in a rotationally fixed manner.

8. The torque converter device according to claim 1, wherein the housing element (10*a*; 10*b*) forms an actuating piston receptacle (19*a*; 19*b*) defining, together with an actuating piston (21*a*; 21*b*), a pressure chamber for actuating the separating clutch (12*a*; 12*b*).

9. The torque converter device according to claim 8, wherein, for actuating the separating clutch (12*a*; 12*b*), the actuating piston receptacle (19*a*; 19*b*) has a partition wall which is formed integrally with the housing element (10*a*; 10*b*).

* * * * *